US009320988B2

(12) United States Patent
Wrench et al.

(10) Patent No.: US 9,320,988 B2
(45) Date of Patent: Apr. 26, 2016

(54) DEGASSING OF A LIQUID TO CONTROLLED LEVEL IN COMPOSITE TUBE

(71) Applicant: Bio-Rad Laboratories, Inc., Hercules, CA (US)

(72) Inventors: Nathan Wrench, Swaffham Prior (GB); William Mainwaring-Burton, Cambridge (GB)

(73) Assignee: BIO-RAD LABORATORIES, INC., Hercules, CA (US)

( * ) Notice: Subject to any disclaimer, the term of this patent is extended or adjusted under 35 U.S.C. 154(b) by 15 days.

(21) Appl. No.: 14/209,974

(22) Filed: Mar. 13, 2014

(65) Prior Publication Data

US 2014/0260970 A1    Sep. 18, 2014

Related U.S. Application Data

(60) Provisional application No. 61/788,146, filed on Mar. 15, 2013.

(51) Int. Cl.
*B01D 19/00* (2006.01)
(52) U.S. Cl.
CPC ................................. *B01D 19/0031* (2013.01)
(58) Field of Classification Search
CPC .. B01D 19/0031; B01D 53/228; B01D 63/06; B01D 2257/104
USPC ............................................... 95/46, 54; 96/6
See application file for complete search history.

(56) References Cited

U.S. PATENT DOCUMENTS

| 4,657,677 | A  | * | 4/1987  | Roubicek et al. | 210/219  |
|-----------|----|---|---------|-----------------|----------|
| 4,695,382 | A  | * | 9/1987  | Cronin          | 210/436  |
| 5,531,904 | A  |   | 7/1996  | Grisham et al.  |          |
| 6,319,398 | B1 | * | 11/2001 | Saitoh          | 210/198.2|
| 6,402,810 | B1 | * | 6/2002  | Mayer et al.    | 95/46    |
| 7,144,443 | B2 |   | 12/2006 | Gerner et al.   |          |
| 2003/0041911 | A1 | * | 3/2003 | Gerner et al.   | 138/30   |
| 2007/0095204 | A1 |   | 5/2007 | Gerner et al.   |          |
| 2010/0218679 | A1 | * | 9/2010 | Hekmat et al.   | 96/6     |
| 2011/0031184 | A1 |   | 2/2011 | Krause et al.   |          |
| 2011/0290726 | A1 | * | 12/2011 | Liu et al.     | 210/640  |

(Continued)

FOREIGN PATENT DOCUMENTS

JP      H06-210105 A    8/1994

OTHER PUBLICATIONS

The International Search Report and Written Opinion from PCT/US2014/026680 dated Jul. 14, 2014.

(Continued)

*Primary Examiner* — Jason M Greene
(74) *Attorney, Agent, or Firm* — Kilpatrick Townsend & Stockton LLP

(57) ABSTRACT

Disclosed herein is an apparatus for debubbling or degassing a liquid. The apparatus includes a tube with a hollow lumen and a gas-permeable, liquid-impermeable wall surrounding the lumen. Also disclosed is a method for performing the debubbling or degassing, wherein the liquid is passed through the tube and gas is allowed to escape through the wall of the tube. The application additionally discloses a system for debubbling or degassing a liquid, wherein a pump is connected to the upstream end of the tube and a device to impede the flow of liquid out the tube is connected to the downstream end.

25 Claims, 2 Drawing Sheets

(56) References Cited

U.S. PATENT DOCUMENTS

2012/0024784 A1    2/2012  Clark et al.
2012/0204726 A1    8/2012  McAdams et al.
2013/0061748 A1*   3/2013  Sims et al. ........................ 95/46

OTHER PUBLICATIONS

Bakalyar et al.; "The role of dissolved gases in high-performance liquid chromatography"; *J. Chromatog.*; 158:277-293 (1978).

Wilhelm et al.; "Low-Pressure Solubility of Gases in Liquid Chromatography"; *Chem. Rev.*; 77(2):219-262 (1977).

* cited by examiner

DEGASSING OF A LIQUID TO CONTROLLED LEVEL IN COMPOSITE TUBE

CROSS-REFERENCES TO RELATED APPLICATIONS

The present application claims priority to U.S. Provisional Patent Application No. 61/788,146, entitled "DEGASSING OF A LIQUID TO CONTROLLED LEVEL IN COMPOSITE TUBE" and filed Mar. 15, 2013, which is incorporated herein by reference for all purposes.

BACKGROUND OF THE INVENTION

Liquid chromatography is used in many industries to purify chemical and biological compounds for analytical and preparative purposes. In liquid chromatography, as well as in other liquid-handling endeavors such as microfluidics, control of dissolved gas concentrations is a prerequisite to accurately metering liquids, detecting species of interest, and separating these species from contaminants. Dissolved gases, in particular $O_2$, can react with species of interest, the liquids carrying these species, and the media (e.g. tubing, chromatography columns) through which these species pass, complicating purification procedures. Gases can also absorb light and interfere with the optical detection of a species in a liquid stream. These problems are made more acute by outgassing, the phenomenon of dissolved gases precipitating out of solution due to, for example, a drop in liquid pressure, an increase in temperature, or a change in solution composition.

Known methods of reducing gas concentrations in liquids include, for example, sparging and vacuum degassing. Sparging involves bubbling a weakly soluble gas such as helium through a liquid, thereby displacing and expunging more soluble gases such as $O_2$ from the liquid. Vacuum degassing involves applying a vacuum to the liquid, such as by evacuating the space above the liquid or drawing a vacuum against a gas-permeable membrane with which the liquid is in contact. In the presence of the vacuum, the solubility of gas in the liquid will fall according to Henry's law, and gas will escape the liquid. Degassing strategies are discussed in Bakalyar et al., *J. Chromatography* 158, 277-293, 1978, in Snyder et al., *Introduction to Modern Liquid Chromatography*, $3^{rd}$ ed., New York: Wiley, 2010, and elsewhere.

These methods are labor intensive and, in the case of vacuum degassing, require an external vacuum source and proper sealing of the space adjacent to the liquid, among other factors.

BRIEF SUMMARY OF THE INVENTION

Provided herein are apparatuses, methods, and systems for debubbling or degassing liquids.

In a first aspect, an apparatus is provided. In some embodiments, the appratus comprises a tube, which comprises a hollow lumen and a gas-permeable, liquid-impermeable wall surrounding said lumen; and a porous outer sheath encasing the tube. The porous outer sheath can comprise a fluoropolymer or braided stainless steel, for example. The length of the tube can be at least 1 cm. In some embodiments, the tube has a circular cross section, and in some embodiments, the average diameter of the lumen can be in the range 1-20 mm. In some embodiments, the average thickness of the wall is in the range 0.1-5 mm. The wall can comprise PORIDEX™ or Teflon® AF, for example, and can be selectively permeable to $O_2$.

In some embodiments, the tube further comprises an upstream end and the apparatus further comprises a pump for driving liquid into the tube, said pump being connected to the upstream end. The pump can be a positive displacement pump, for example. In some embodiments, the tube further comprises a downstream end and the apparatus further comprises a device for impeding the flow of liquid out of the tube, said device being connected to the downstream end. The device can be a pump, chromatography column, or pressure regulator, for example.

In a second aspect, a method of debubbling or degassing a liquid is provided. The method can comprise the steps of: providing an apparatus as recited above; passing the liquid through the tube of the apparatus; and allowing gas to escape through the wall of the tube, such that the concentration of gas in the liquid is higher when the liquid enters the tube than when it exits the tube. In some embodiments, the liquid exiting the tube has an $O_2$ concentration of at least 1, 5, or 10 ppm.

Alternatively, the method can comprise: providing a tube comprising a hollow lumen and a gas-permeable, liquid-impermeable wall surrounding said lumen; passing the liquid through the tube; and, allowing gas to escape through the wall of the tube, wherein the total pressure of gas in contact with the exterior of the tube is at least 0.5 bar absolute. In some embodiments, no vacuum is applied to the exterior of the tube. In some embodiments, the gas in contact with the exterior of the tube is ambient air, or comprises $O_2$ or $N_2$, for example. The total pressure of gas in contact with the exterior of the tube can be in the range 0.5-10 bar absolute, for example.

In the methods described herein, the liquid can be passed through the tube at a forward pressure of at least 0.1 bar gauge, or in the range 0.1-1 bar gauge, for example. In some embodiments, the forward pressure can correspond to an $O_2$ solubility in the liquid of at least 1, 5, or 10 ppm. The liquid can be passed through the tube at a rate of 0.1-100 mL/min, for example.

In a third aspect, a system for debubbling or degassing a liquid is provided. The system comprises: a tube comprising a hollow lumen, a gas-permeable, liquid-impermeable wall surrounding said lumen, an upstream end, and a downstream end; a porous outer sheath encasing the tube; a pump connected to the upstream end of the tube; and, a device connected to the downstream end of the tube, wherein the pump drives liquid into the tube, the device impedes the flow of liquid out of the tube, and gas is allowed to escape through the wall of the tube.

In some embodiments, the system further comprises a debubbler connected to the upstream end or downstream end of the tube.

The device of the system can be a pump, chromatography column, or pressure regulator, for example. In some embodiments of the system, the total pressure of gas in contact with the exterior of the tube is at least 0.5 bar absolute. In some embodiments, the liquid is passed through the tube at a forward pressure of at least 0.1 bar gauge.

DETAILED DESCRIPTION OF THE INVENTION

Figure 1:
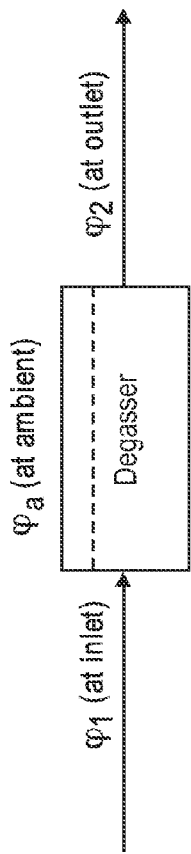
FIG. 1 is a schematic view of a degassing appartus according to some embodiments of the invention.

The inventors have made discoveries regarding aspects of degassing liquids. For example, in some aspects, the inventors have surprisingly discovered that degassing can be achieved at atmospheric pressure (i.e., without applying an external vacuum), by forcing a liquid under pressure through a gas-permeable tube. This can optionally be achieved by reinforcing the tube with a sheath surrounding the tube. Accordingly, provided herein is an apparatus for degassing a liquid. The apparatus includes a tube through which liquid is passed (FIG. 1). The tube, in turn, includes a hollow lumen and a gas-permeable, liquid-impermeable wall surrounding the lumen. Liquid pressure in the tube drives gas through the wall to the space outside the wall, and thereby provides the driving force for degassing.

The apparatus can also be used for dububbling. As the terms are understood in the art, degassing refers to the removal of dissoved gas from a liquid, while debubbling refers to the removal of undissolved gas. For a liquid held in an enclosed container, gas molecules are in equilibrium between the dissolved and undissolved states, and the equilibrium can be shifted due to changes in pressure or other conditions, resulting in dissolution or precipitation of gases. The same apparatus or method can be used to perform both debubbling and degassing.

The term 'gas-permeable' has the meaning commonly understood in the art. The wall of the tube is considered 'gas-permeable' if a gas such as $O_2$ can pass through the wall at a rate or extent above a threshold desired by the practitioner, such as 10, 100, 1,000, 10,000, or 100,000 centibarrers. The physical characteristics of the wall determine in part the transport properties of gas molecules through the wall. These physical characteristics include, for example, the thickness of the wall and the size of pores in the wall. In some embodiments of the apparatus, the wall of the tube has an average thickness in the range 0.1-5 mm. The size of pores is a property of the material or materials of which the wall is made, i.e. the material(s) that the wall comprises. In some embodiments, the wall comprises PORIDEX™, or an amorphous perfluorinated polymer such as Teflon® AF. Gas molecules can pass in both directions across the wall: from the liquid inside the tube to the space outside the tube, and in the opposite direction.

The term 'liquid-impermeable' also has the meaning commonly understood in the art. The wall of the tube is considered 'liquid-impermeable' if a liquid such as water passes through it at a rate or extent not exceeding a threshold desired by the practitioner. For example, under operating conditions in some embodiments, the total volume of water passing through the wall does not exceed 0.001, 0.01, 0.1, 1, 10, or 100 mL per hour. Taken together, the terms 'gas-permeable' and 'liquid-impermeable', as applied to the wall of the tube, can be understood to mean that the wall is selectively permeable to gases, in that it allows the passage of gases more readily than liquids. In some embodiments of the apparatus, the wall of the tube can be selectively permeable to $O_2$, a gas that complicates sample purification in liquid chromatography and that may be the target of degassing efforts.

In addition to the tube, the apparatus can further include a porous outer sheath encasing the tube (FIG. 1). The sheath confers mechanical strength upon the tube, for example allowing the tube to bend more easily and preventing the tube from swelling due to liquid pressure. The sheath can, but need not, have a length equal to that of the tube. In some embodiments, the sheath lies directly over the tube, and is in contact with the exterior of the tube (i.e., the outside of the wall of the tube). The sheath can contact the exterior along some or all of the length of the tube, or over some or all of the area of the exterior. The sheath is 'porous' in that it allows gas driven from the liquid through the wall to escape to the space outside the apparatus, and allows gas in the space between the wall and sheath to rapidly equilibrate with gas outside the apparatus. Accordingly, whether or not the sheath is present, gases present outside the apparatus are considered to be in contact with the exterior of the tube. Without limitation, the sheath can include a fluoropolymer or a stainless steel overbraid, or both.

Conditions pervading or surrounding the apparatus are termed 'ambient', and also affect the efficiency of degassing. These conditions include, for example, the temperature, the partial pressures of various gases that may be present outside the apparatus, and the total gaseous pressure, which approximately equals the sum of these partial pressures. Henry's law states that the solubility of a gas in a liquid, at equilibrium, is proportional to the partial pressure of that gas above the liquid. In a reflection of Henry's law, the pressures of gases in contact with the exterior of the tube affect the solubility of gases inside the tube, although the presence of the wall can slow the exchange of gas molecules between the outside and inside, such that equilibration is not necessarily achieved on the timescale that liquid passes through the tube. The solubility of a gas in a liquid, or equivalently the concentration of the gas in the liquid at saturation, that exists upon exposing the liquid directly to the gas (with no intervening tube wall or sheath) in the absence of liquid pressure and allowing equilibration to occur, is herein called its ambient solubility ($\phi_a$). The ambient solubility depends on ambient conditions, and is generally higher at higher gas pressures and lower temperatures.

In some embodiments of the invention, the apparatus can be placed in a closed container, allowing control over the ambient conditions to which the apparatus is exposed. For example, the apparatus can be immersed in a purified gas, such as $O_2$ or $N_2$, or a limited set of gases, at controlled pressures. In some circumstances it is desirable to choose pressures that are sufficiently high so as to prevent excessive degassing, as discussed below. Therefore, the total pressure of gases to which the tube is exposed can be, for example, as high as 10 bar absolute.

In other embodiments, such as when the closed container is absent, the gas (or mixture of gases) in contact with the exterior of the tube is the surrounding air, and the total gaseous pressure is simply the prevailing atmospheric pressure. Similarly, the ambient temperature can be the temperature in the room or environment in which the apparatus is located. Atmospheric pressure typically varies from approximately 0.5 to 1.1 bar absolute, depending on elevation and weather conditions, among other factors. Therefore, in some embodiments, the total pressure of gas in contact with the exterior of the tube is at least 0.5, 0.6, 0.7, 0.8, or 0.9 bar absolute. In some embodiments, whether or not a closed container is present around the apparatus, no vacuum is applied to the exterior of the tube.

The absence of a vacuum simplifies construction and operation of the apparatus and distinguishes the apparatus from other degassers known in the art. In particular, the absence of a vacuum can reduce the need for mechanical reinforcement of the tube. Such reinforcement can be beneficial when a large pressure differential is present between the lumen and exterior of the tube, to prevent the tube from expanding or bursting. The porous outer sheath, which encases the tube and provides mechanical strength, can be used in any embodiment of the invention, but need not be present when the ambient gaseous pressure is sufficiently high or the pressure differential between the lumen and exterior of the tube is sufficiently low.

The liquid pressure that drives degassing in the tube is called the 'forward pressure'. In some embodiments of the invention, the forward pressure is at least 0.1 bar gauge, or in the range 0.1-1 bar gauge. (As the terms are used herein, 'bar absolute' are units of absolute pressure and 'bar gauge' are units of gauge pressure. These terms have the standard meanings understood in the art. In particular, the gauge pressure of a liquid in the tube is relative to the ambient gaseous pressure.)

For degassing to occur using the apparatus, the concentration of a gas in the liquid entering the tube is higher than the ambient solubility in some embodiments. That is, there is an excess of gas in the liquid. The extent of debubbling or degassing of a particular gas achieved using the apparatus can be quantified using the following equation:

$$\phi_2 = \phi_1 - (\phi_1 - \phi_a)\mu$$

Figure 2:
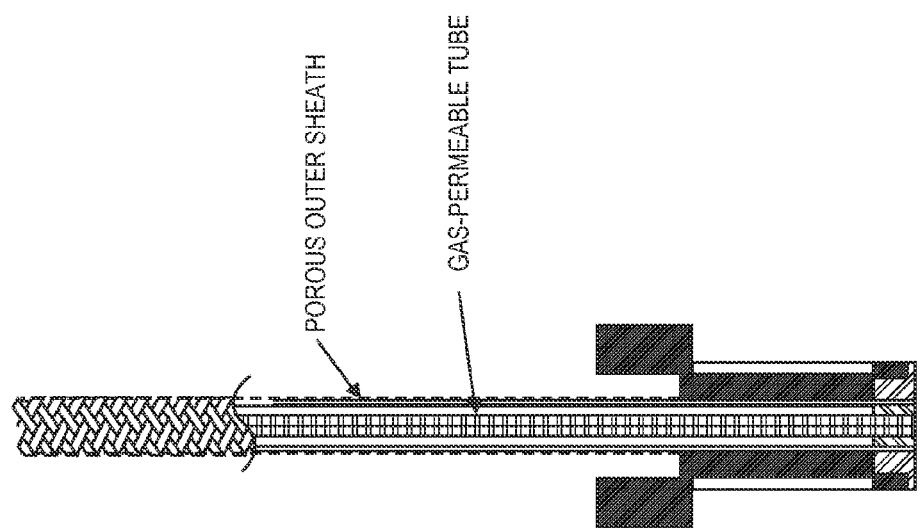
FIG. 2 shows where variables denoting gas concentrations can be determined with respect to the degassing apparatus.

Here, $\phi_1$ is the gas concentration as the liquid enters the tube, and $\phi_2$ is the concentration as the liquid exits the tube (FIG. 2). The degasser effectiveness, $\mu$, is defined as $(\phi_1 - \phi_2)/(\phi_1 - \phi_a)$, and represents the drop in gas concentration across the degasser as a fraction of the excess gas concentration. As used herein, the 'gas concentration' in a liquid can refer to dissolved or undissolved gas, or both.

Degasser effectiveness is a function of the forward pressure and the physical properties of the tube, among other factors. These physical properties include, in addition to the thickness and material properties of the wall (discussed above), the cross-sectional shape and length of the tube. In some embodiments, the tube has a circular cross-section, and the lumen has an average diameter in the range 1-20 mm. In some embodiments, the length of the tube is at least 1 cm. The inventors found that a longer tube resulted in more extensive degassing, all else being equal.

The tube of the apparatus can further include an upstream end and a downstream end. The naming of these ends reflects the directionality of liquid flow through the tube, with liquid entering the upstream end and exiting the downstream end. Through the upstream or downstream ends, the tube can be connected to one or more liquid handling elements that facilitate degassing through the tube, such as by generating the forward pressure or regulating the flow rate of the liquid. As the term is used herein, 'connected' indicates a sealed connection, such that the liquid (and any gas dissolved or suspended therein) can pass freely between the tube and additional element, but substantially no liquid or gas can pass from the tube or element to the space outside the apparatus through the connection. The connection can be direct or indirect: for example, the tube and additional element can directly adjoin each other, or there can be a check valve or other intervening component between them.

Figure 3:
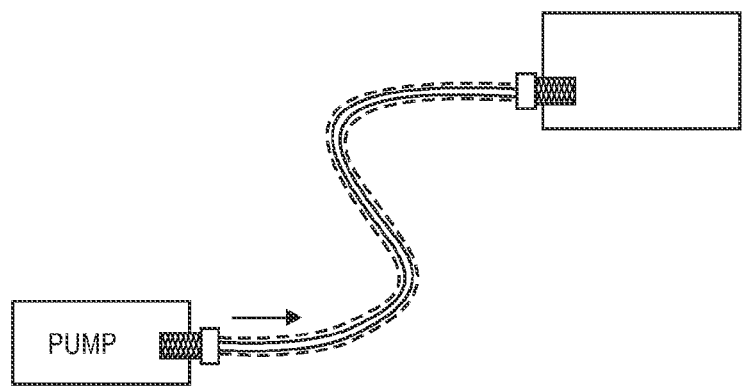
FIG. 3 shows the tube of a degassing apparatus connected to a pump at the upstream end and a device for impeding the flow of liquid out of the tube at the downstream end.

In some embodiments, the upstream end of the tube is connected to a pump (FIG. 3). The pump can belong to any of the types of pump known in the art for moving liquid. For example, the pump can be a positive displacement pump, velocity pump, or gravity pump. Regardless of type or design, the pump has the effect of driving liquid into the tube and generating forward pressure.

In some embodiments, the downstream end of the tube is connected to a device to impede the flow of liquid out of the tube. The device can provide such impedance using any mechanism known in the art, such as by presenting an obstacle to the flow of the liquid, or forcing the liquid through a narrow aperture. Without limitation, the device can be a chromatography column, valve, or pressure regulator. The device can also be a pump, for example configured to pass liquid at a lower rate than liquid arrives at the pump's inlet.

A system for debubbling or degassing a liquid is also provided. The system can include a tube, a porous outer sheath encasing the tube, a pump connected to the upstream end of the tube, and a device connected to the downstream end of the tube. The system elements and the relationships among them are as described above. Similarly, the conditions for accomplishing debubbling or degassing are as described above. The pump drives liquid into the tube, the device impedes the flow of liquid out of the tube, and gas is allowed to escape through the wall of the tube. The system can include additional elements, such as a vacuum- or filter-based debubbler of the sort known in the art. Such an additional element can occur upstream or downstream of the tube. The tube and other elements of the system can be described as 'in-line' because they involve the linear transfer of liquid from the pump to the tube to the device. More generally, degassing or debubbling using an apparatus or system disclosed herein can be said to occur 'in-line'.

Further provided herein is a method of debubbling or degassing a liquid. The method includes providing a tube comprising a hollow lumen and a gas-permeable, liquid-impermeable wall surrounding said lumen, such as the tube of the apparatus disclosed above; passing the liquid through the tube; and allowing gas to escape through the wall. Debubbling or degassing occurs when the concentration of gas in the liquid is higher when the liquid enters the tube than when it exits the tube. In some embodiments, the liquid is passed through the tube at a rate in the range 0.1-100 mL/min.

Figure 4:
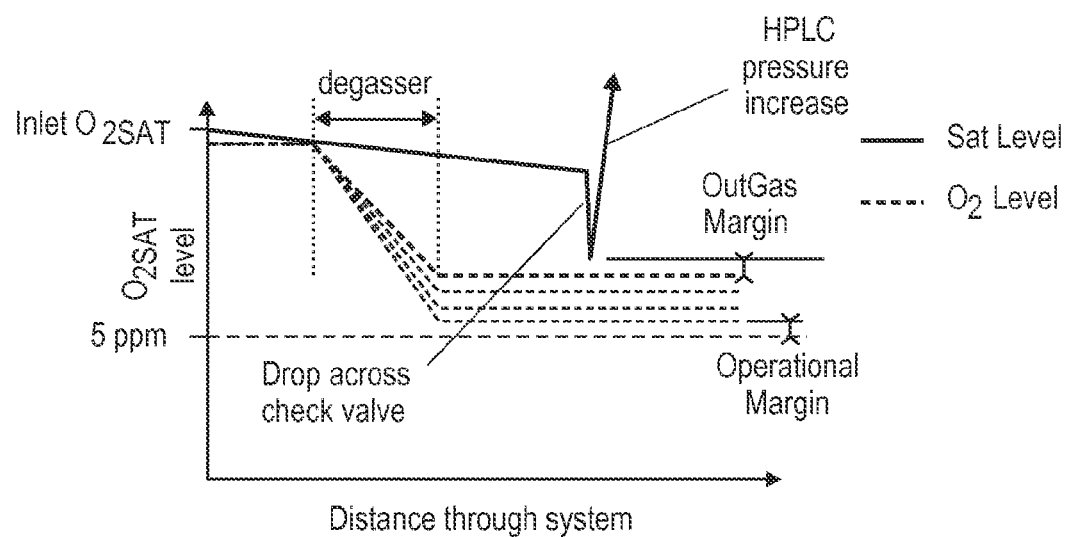
FIG. 4 shows the concentration of dissolved $O_2$ in a liquid chromatography system as a function of distance through the system.

The inventors found that it is sometimes desirable to avoid excessive degassing or debubbling, i.e. to prevent the concentration of gas in the liquid from falling below a certain level. This is because, among other reasons, the gas concentration cannot be reliably measured below this level with some detection means commonly used in the art. When the gas concentration is unknown, it is difficult to predict the effect of dissolved gases on, for example, chromatographic retention times. Accordingly, in some embodiments, conditions are chosen such that liquid exiting the tube has an $O_2$ concentration of at least 1, 5, or 10 ppm (FIG. 4). The difference between the gas concentration in the liquid and the minimum acceptable concentration is herein called the 'operational margin'.

Outgassing, or the precipitation of a dissolved gas from a liquid, can occur when the concentration of that gas exceeds its solubility under ambient conditions. Applying forward pressure to a liquid stream raises the solubility of a gas in the liquid above the ambient solubility, and can prevent outgassing. By applying higher forward pressures, the inventors found that they could achieve more effective degassing while also preventing outgassing from liquids that were saturated with gas upon bottling or introduction to the apparatus. The forward pressure therefore insures against undesired outgassing that can result from localized pressure changes, for example a pressure drop across a check valve connected to the apparatus. In some embodiments, the forward pressure was chosen to correspond to an $O_2$ solubility of at least 1, 5, or 10 ppm at a particular point relative to the apparatus. The difference between the solubility and concentration of a gas in a liquid is herein called the 'outgas margin'.

The concentrations of dissolved gases can be measured in the apparatus or system described herein as desired by the practitioner. For example, a detector can be placed in the tube of the apparatus, upstream of the tube, or downstream of the tube. The detector can be a UV detector that tracks the absorbance of the liquid. $O_2$ is known to change the baseline UV absorbance of liquids, in the absence of other absorbent species, in a concentration-dependent manner. Other means of measuring dissolved gas concentrations are known in the art.

All documents (for example, patents, patent applications, books, journal articles, or other publications) cited herein are incorporated by reference in their entirety and for all purposes, to the same extent as if each individual document was specifically and individually indicated to be incorporated by reference in its entirety for all purposes. To the extent such documents incorporated by reference contradict the disclosure contained in the specification, the specification is intended to supersede and/or take precedence over any contradictory material.

Many modifications and variations of this invention can be made without departing from its spirit and scope, as will be apparent to those skilled in the art. The specific embodiments described herein are offered by way of example only and are not meant to be limiting in any way. It is intended that the specification and examples be considered as exemplary only, with the true scope and spirit of the invention being indicated by the following claims.

What is claimed is:

1. A method of debubbling or degassing a liquid, the method comprising,
providing:
   a) a tube comprising a hollow lumen, a gas-permeable, liquid-impermeable wall surrounding said lumen, an upstream end, and a downstream end;
   b) a pump connected to the upstream end of the tube;
   c) a device connected to the downstream end of the tube; and
passing the liquid through the lumen of the tube;
wherein the pump drives the liquid into the tube, the device impedes the flow of the liquid out of the tube, and gasses or bubbles escape through the gas-permeable, liquid-impermeable wall of the tube.

2. The method of claim 1, wherein liquid exiting the tube has an $O_2$ concentration of at least 1-ppm.

3. A method of debubbling or degassing a liquid, the method comprising:
   a) providing a tube comprising a hollow lumen and a gas-permeable, liquid-impermeable wall surrounding said lumen;
   b) providing a pump connected to the upstream end of the tube;
   c) providing a device connected to the downstream end of the tube, wherein the device impedes the flow of the liquid out of the tube;
   b) passing the liquid through the tube under a positive pressure; and,
   c) allowing gas to escape through the wall of the tube,
wherein the total pressure of gas in contact with the exterior of the tube is at least 0.5 bar absolute.

4. The method of claim 3, wherein no vacuum is applied to the exterior of the tube.

5. The method of claim 3, wherein said gas in contact with the exterior of the tube is ambient air.

6. The method of claim 3, wherein said total pressure is in the range 0.5-10 bar absolute.

7. The method of claim 3, wherein the liquid is passed through the tube at a forward pressure of at least 0.1 bar gauge.

8. The method of claim 7, wherein the forward pressure is in the range 0.1-1 bar gauge.

9. The method of claim 7, wherein the forward pressure corresponds to an $O_2$ solubility of at least 1-ppm.

10. The method of claim 7, wherein the liquid is passed through the tube at a rate of 0.1-100 mL/min.

11. A system for debubbling or degassing a liquid, the system comprising:
   d) a tube comprising a hollow lumen, a gas-permeable, liquid-impermeable wall surrounding said lumen, an upstream end, and a downstream end;
   e) a porous outer sheath encasing the tube;
   f) a pump connected to the upstream end of the tube; and,
   g) a device connected to the downstream end of the tube,
wherein the pump drives liquid into the tube, the device impedes the flow of liquid out of the tube, and gas is allowed to escape through the wall of the tube.

12. The system of claim 1, further comprising a debubbler connected to the upstream end or downstream end of the tube.

13. The system of claim 11, wherein the liquid is passed through the tube at a forward pressure of at least 0.1 bar gauge.

14. The method of claim 2, wherein liquid exiting the tube has an $O_2$ concentration of at least 5 ppm.

15. The method of claim 2, wherein liquid exiting the tube has an $O_2$ concentration of at least 10 ppm.

16. The method of claim 9, wherein the forward pressure corresponds to an $O_2$ solubility of at least 5 ppm.

17. The method of claim 9, wherein the forward pressure corresponds to an $O_2$ solubility of at least 10 ppm.

18. The method of claim 1, wherein no vacuum is applied to the exterior of the tube.

19. The method of claim 1, wherein ambient air is in contact with the exterior of the tube.

20. The method of claim 1, wherein the total pressure of gas in contact with the exterior of the tube is in the range 0.5-10 bar absolute.

21. The method of claim 1, wherein the liquid is passed through the tube at a forward pressure of at least 0.1 bar gauge.

22. The method of claim 21, wherein the forward pressure is in the range 0.1-1 bar gauge.

23. The method of claim 1, wherein the liquid is passed through the tube at a rate of 0.1-100 mL/min.

24. The method of claim 1, wherein the gas-permeable, liquid-impermeable wall of the tube comprises an amorphous perfluorinated polymer.

25. The method of claim 1, wherein a porous outer sheath encases the tube.

* * * * *